Figure 1:
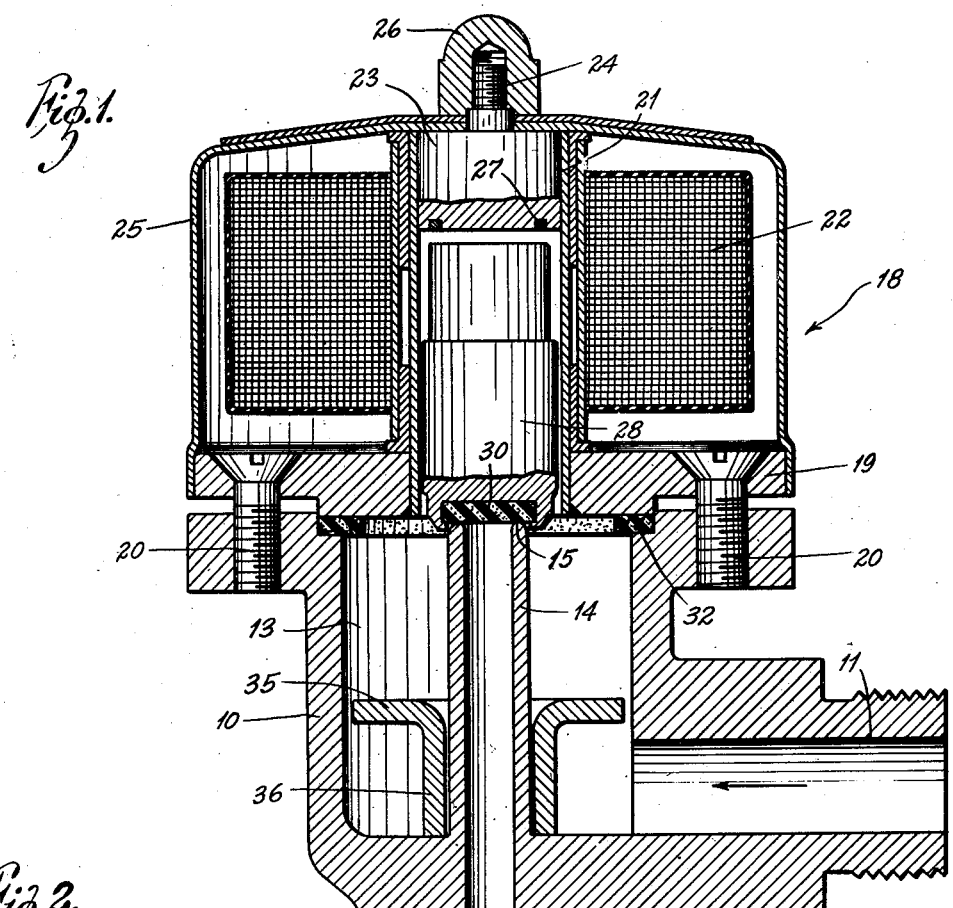

May 10, 1955     F. M. MacDOUGALL     2,708,090

ELECTROMAGNETICALLY CONTROLLED METERING VALVE MECHANISM

Filed May 12, 1949

INVENTOR:
FRANKLIN M. MacDOUGALL,
By Rogers & Ezell
ATTORNEYS.

United States Patent Office 2,708,090
Patented May 10, 1955

2,708,090

ELECTROMAGNETICALLY CONTROLLED METERING VALVE MECHANISM

Franklin M. MacDougall, Kirkwood, Mo., assignor to Alco Valve Company, University City, Mo., a corporation of Missouri Application May 12, 1949, Serial No. 92,753

9 Claims. (Cl. 251—16)

The present invention relates to a metering valve, and especially one that consists of a minimum number of operating parts, that is easy to assemble, and that is easy to clean, so that it can be used with foods and the like.

The valve is of the type having an inlet and an outlet separated by a valve seat, and with a metering chamber between the inlet and the valve seat. In the chamber, there is a vane or metering disc urged toward the inlet when the valve seat is closed. When the valve is opened, the metering disc is carried forward to an advanced position by the pressure difference between the inlet and the outlet, that causes the liquid quantity between the disc and the valve seat to be discharged past the valve seat during the advance movement of the metering disc by the higher pressure inlet liquid behind it. When the disc has been advanced a certain distance, it is stopped, and preferably closes a secondary valve, thereby preventing further discharge. When the main valve is thereafter closed, the pressure differential is disestablished, and the loose fitting (or non-sealing) disc is returned through the liquid back of it, to its initial position.

Other objects and advantages of the construction will appear from the description to follow.

Figure 2:
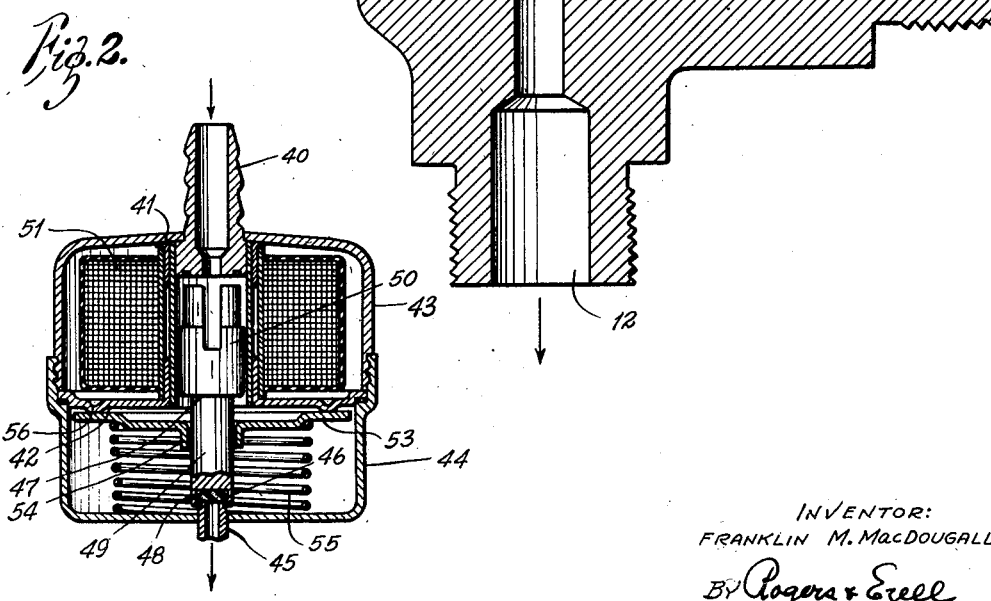

In the drawings:

Fig. 1 is a vertical medial section through the preferred construction of metering valve; and Fig. 2 is a vertical medial section through a modified construction of metering valve.

Referring particularly to Fig. 1, a valve housing is shown at 10 with an inlet 11 and an outlet 12. The inlet leads into one end of a metering chamber 13 and the outlet 12 is connected through an upstanding tubular boss 14 to a main valve seat 15 that is at the top, or outlet end, of the chamber 13.

The top of the housing receives and is closed by a solenoid valve arrangement generally indicated at 18. This includes a bottom plate 19 that is secured to the housing 10 by screws 20. This bottom plate 19 has a central tubular element 21 within it that is concentric with the upstanding tubular boss 14 of the main valve housing 10. A solenoid coil 22 is mounted around the tubular member 21. The upper end of the tubular member is closed by a plug 23 that has a threaded extension 24 at its top, about which a closure 25 is mounted and held by a closing nut 26. A shading ring 27 may be provided on the plug 23, as desired.

A main solenoid-plunger valve element 28 is disposed within the tubular member 21 above the valve seat 15. This valve 28 is moved from its released, valve-closing position, illustrated in Fig. 1, to its raised, valve-opening position, when the coil 22 is energized by closure of some suitable control switch. The plunger 28 is provided with a more or less resilient valve seat element 30 in its bottom surface which may engage with the valve seat 15 of the tubular boss 14 to prevent outflow from the chamber 13 to the outlet 12.

The plate 19 is sealed to the housing 10 by a gasket 32 that projects outwardly somewhat from beyond the inner walls of the chamber 13.

The chamber 13 is illustrated as cylindrical in shape, and it receives a metering disc or vane 35. This vane 35 has a sleeve type of guide portion 36 that surrounds the tubular boss 14 fairly closely so as to permit only very limited leakage flow between the tubular portion 14 and the sleeve part 36, but yet to provide free guided movement of the piston 35 upwardly and downwardly on the boss 14. The periphery of the vane 35 terminates inwardly of the walls of the chamber 13 by a slight distance, such as that illustrated in the drawings. However, when in its upper position, the vane 35 will engage the gasket 32 in a closing relationship, substantially stopping flow around the piston, except only for the seal-breaking leakage between the sleeve 36 and the tubular boss 14.

*Operation*

When the inlet 11 and the outlet 12 are connected in a liquid conducting system, liquid will be admitted to the chamber 13 beneath the piston 35. With the main valve 28 closed, there can be no flow of this liquid around the valve seat 15 and into the outlet 12. However, liquid in the chamber 13 can pass around the periphery of the metering vane 35, and will fill the chamber 13 on both sides of the metering vane 35.

When the coil 22 is energized, the main valve 28 is lifted, opening the valve seat 15 and producing a relatively low pressure condition on the upper side of the metering vane 35. Below the metering vane, inlet pressure prevails. Consequently, there will be a flow condition produced in which the liquid within the chamber tends to flow into the outlet, and it is replenished by additional flow in the inlet. When this occurs, the vane 35 will be advanced from the position illustrated, upwardly to the top of the chamber 13, the liquid above it being discharged in this operation. When the vane 35 reaches the top of the chamber 13, the periphery of its flange will engage the gasket 32, and will thereby substantially prevent any further outflow of liquid, regardless of the fact that the main valve 28 may not reclose immediately.

Normally, in valves of this type, the main valve is kept open for a limited period of time, which is approximately equal to the time that it takes for the metering vane 35 to move from its starting position upwardly to the end of its stroke. The metering vane prevents the discharge of an improper amount of liquid, regardless of variation in the length of time that the main valve may be opened or regardless of moderate changes in pressure, viscosity and the like, in the liquid itself. It is only necessary that the main valve be set to remain open long enough for the discharge of the desired amount of liquid to occur under most disadvantageous conditions. Then, under better conditions, there cannot be an excessive discharge because of the presence of the metering piston.

When the main valve is reclosed, the pressure below and above the metering piston equalizes very soon by leakage, coupled with the effect of gravity upon the piston 35. As soon as the closure is broken between the flange portion of the piston 35 and the overhanging portion of the gasket 32, the piston will drop more rapidly because the space between the outer periphery of the flange and the inner surface of the wall 13 permits the piston to descend through the liquid, the liquid passing around its peripheral edge. Consequently the piston becomes ready for a new metering operation almost immediately after one operation is completed.

*Modification of Fig. 2*

It will, of course, be understood that a spring may be used in aid of gravity and to increase the speed as is desired. A valve of somewhat modified construction but illustrating the use of a spring is shown in Fig. 2.

In the valve of Fig. 2, the inlet fitting 40 is connected directly into the tubular member 41. The bottom of this tubular member is made integral with a circular plate 42 that is sealed over the open end of a cup-shaped housing 43, by another cup-shaped element 44. The member 44 receives an outlet fitting 45 that has a main valve seat 46 at its upper end.

A main valve 47 is provided with a valve closure gasket 48 which is disposed in a somewhat reduced cylindrical end 49 of this main valve. The upper and enlarged end 50 of the valve is located within the tubular member 41 so as to be influenced by a solenoid coil 51. The upper end of the valve core 50 is cut away, and the core is suitably shaped to insure the free flow of liquid from the inlet 40 downwardly past the core 50 to enter the top of the lower cup member 44.

Within the lower cup member, there is a metering piston or disc 53 that has a cylindrical flange 54 surrounding the lower reduced portion 49 of the valve plug 47. The sleeve portion 54 assures a guided vertical travel of the disc 53, and may act as a secondary valve, as will appear.

The disc is normally urged in an upward position by a coil spring 55, and, when it is in its released uppermost position illustrated in the drawing, it seats against a circular ridge 56.

The operation of this type of the valve is similar to the previously described one. At the start, liquid fills the tubular part 41 and the cup 44 above and below the disc 53. When the coil 51 is energized, the valve core element 47 is lifted, opening the valve and producing a low pressure area below the disc 53. The opening of the main valve permits the liquid to flow out through the outlet 45, and the inlet pressure acting above the disc forces the disc 53 downwardly against the spring. When the disc 53 is in its lowermost position, the lower edge of its sleeve part 54 preferably will engage the inner surface of the cap 44 and thereby effect both a positive limiting of the travel of the piston and almost a sealing off of the inlet from the outlet, despite the fact that the main valve is open. In other words, the arrangement will meter out the amount of liquid that is beneath the plate 53, whenever the valve 50 is open.

As soon as the coil 51 is deenergized, the valve plunger 47 descends, closing the main valve. This will permit the pressures to equalize by leakage on opposite sides of the disc 53, which thereupon will be caused to rise again under the influence of the spring 55. In this type of valve, the disc 53 should fit more closely with the inside walls of the cup-shaped member 44, so that pressures will not equalize on opposite sides of the piston immediately upon the piston's reaching the lower end of its stroke.

In both types of the valve, there is an upright central, axial column along part of which the metering member is guided. In Fig. 1, the column is formed by the boss 14 and the core 28 with the metering member 35 slidably guided by the part 14. In Fig. 2, the column is formed by the valve stem portion 49 and the core portion 50, with the metering disc slidable along the former.

What is claimed is:

1. In a valve construction, a valve housing, an inlet leading into the housing, an outlet leading from the housing, a main valve mechanism between the inlet and the outlet, a metering chamber in the housing ahead of the main valve mechanism, the metering chamber communicating at one of its ends with the inlet and communicating at the other of its ends with the main valve mechanism, and a vane-like metering member in the metering chamber, said metering member having one liquid receiving surface facing toward the inlet and an opposite liquid receiving surface facing toward the main valve mechanism, said metering member substantially dividing the metering chamber into an inlet portion and an outlet portion, with restricted communication from one to the other, whereby when the main valve mechanism is opened inlet pressure may force the metering member toward the outlet to expel liquid on the outlet side of the metering member until said member reaches the outlet end of its stroke, the main valve mechanism including a valve seat member, a valve and core member; a solenoid coil for moving the core member; the valve being connected with the core member, and the valve seat and valve core members providing an elongated center column in the housing, the vane-like metering member being mounted for sliding movement along the valve seat portion of the column.

2. The combination of claim 1, together with means to substantially prevent flow from the inlet side to the outlet side of the metering member when the metering member reaches the outlet end of its stroke as aforesaid.

3. A metering valve including a valve housing having an inlet leading thereinto and an outlet leading therefrom, and valve mechanism including a valve seat and a valve closing device, a metering chamber in the housing and into which the inlet connects, the valve mechanism being disposed between the metering chamber and the outlet, and the valve mechanism having an upright element along the axis of the metering chamber, a vane-like metering member mounted around said element and reciprocable therealong from a first position removed from the valve seat to a second position toward the valve seat with respect to said first position, the metering member having a face directed toward the inlet of the metering chamber, the metering member extending transversely of the metering chamber and dividing the same into an inlet end and an outlet end, means providing restrictive communication from the inlet end to the outlet end of the metering chamber, and closure means for said restrictive communication means closed by movement of the metering member to the outlet end of its stroke.

4. The combination of claim 3, wherein the metering member is of a shape to afford space for the passage of liquid around its peripheral edge, and in which the closure means consists of a seat in the path of the periphery of the metering member to be engaged thereby when the metering member reaches the outlet end of its stroke, and to close off said peripheral passage.

5. The combination of claim 3, together with yieldable means normally urging the metering member toward the inlet end of its stroke.

6. A metering valve including a valve housing having an inlet and an outlet, said housing providing a metering chamber between the inlet and the outlet, a tubular element having its interior connected with the outlet, and extending through the metering chamber along the axis thereof, a main valve seat at the end of said tubular member, a main valve adapted to close with said valve seat, a metering member comprising a vane-like device surrounding the tubular member to be guided thereby in movement from an initial position on the inlet side of said main valve to a second position toward the main valve when the main valve is opened, said vane-like member having an inlet face exposed to inlet fluid pressure at the inlet end of the valve housing, and having an outlet face exposed to pressure at the main valve, and means providing restricted flow of fluid from the inlet side of the metering member to the outlet side thereof.

7. The combination of claim 6 wherein the last recited means comprises a restricted passage from said inlet side to said outlet side bounded by at least a portion of said vane-like metering member, and closure means for said passage fixed to the housing adjacent the end of the stroke of the metering member and engaged by the same to close said passage when the metering member reaches the end of its stroke.

8. The combination of claim 6 wherein the periphery of the metering member is smaller than the adjacent size of the wall of the metering chamber to provide a passage around the metering member, which constitutes the restricted flow means of said claim aforementioned, and a closure seat disposed adjacent the end of the stroke of the metering member, projecting inwardly toward the axis thereof beyond the limits of said passage, so as to be engaged by the metering member when it reaches the end of its stroke and to disestablish communication from one side to the other of the metering member at such point, and means providing highly restrictive communication from one side to the other of the metering member when the aforesaid closure means is in operation.

9. A metering valve including a housing having an inlet and an outlet, a valve seat adjacent the outlet, a metering chamber communicating at one end with the inlet side of the housing and communicating at the other end with the outlet valve seat, a main valve reciprocable into and out of engagement with the valve seat and extending through the metering chamber along the axis thereof, a metering disc extending across the metering chamber and substantially dividing the same into a section on the inlet side and an outlet side section, yieldable means normally urging the metering disc toward the inlet end of its stroke, the metering disc having a flange that is concentric with said valve member and that extends along the surface thereof to be guided thereby, said flange and valve housing having cooperative parts shaped to substantially close off communication from the metering chamber to the valve and outlet when the metering disc is positioned at the outlet end of its stroke.

References Cited in the file of this patent

UNITED STATES PATENTS

| | | |
|---|---|---|
| 962,911 | Morris | June 28, 1910 |
| 1,146,114 | Thompson | July 13, 1915 |